US012602627B2

(12) United States Patent
Witzig et al.

(10) Patent No.: US 12,602,627 B2
(45) Date of Patent: Apr. 14, 2026

(54) SOLVING SUPPLY NETWORKS WITH DISCRETE DECISIONS

(71) Applicant: SAP SE, Walldorf (DE)

(72) Inventors: Jakob Witzig, Walldorf (DE); Anna Walter, Walldorf (DE); Christoph Eckert, Muhlhausen (DE); Dimitri Kniasew, Walldorf (DE); Maximilian Pfister, Walldorf (DE); Carsten Schumm, Karlsruhe (DE); Claudia Volke, Bruchsal (DE)

(73) Assignee: SAP SE, Walldorf (DE)

( * ) Notice: Subject to any disclaimer, the term of this patent is extended or adjusted under 35 U.S.C. 154(b) by 384 days.

(21) Appl. No.: 18/105,281

(22) Filed: Feb. 3, 2023

(65) Prior Publication Data

US 2024/0265314 A1 Aug. 8, 2024

(51) Int. Cl.
*G06Q 10/063* (2023.01)
*G06F 9/445* (2018.01)
(Continued)

(52) U.S. Cl.
CPC ......... *G06Q 10/04* (2013.01); *G06F 9/44521* (2013.01); *G06Q 10/063* (2013.01); *G06Q 10/087* (2013.01)

(58) Field of Classification Search
None
See application file for complete search history.

(56) References Cited

U.S. PATENT DOCUMENTS 8,429,035 B1 * 4/2013 Kamath ................. G06Q 10/06
                                                        705/28
8,965,548 B1 * 2/2015 Kamath ........... G06Q 10/06315
                                                        700/100
(Continued)

FOREIGN PATENT DOCUMENTS

EP        3654226 A1 * 5/2020 ......... G06Q 30/0201

OTHER PUBLICATIONS

Gamrath et al, Tackling industrial-scale supply chain problems by MIP, Computational Mathematics, pp. 866-888, Nov. 1, 2019 https://www.jstor.org/stable/45281384 (Year: 2019).*
(Continued)

*Primary Examiner* — Octavian Rotaru
(74) *Attorney, Agent, or Firm* — Buckley, Maschoff & Talwalkar LLC

(57) ABSTRACT
The example embodiments are directed to methods and systems for generating a model of an optimum flow of materials within a supply network based on a relax mixed integer programming model. For example, the method may include generating, via a software application, a model of the supply network based on the data stored in the storage device, executing a MIP optimizer on the model to generate a configuration of a flow of materials within the supply network, wherein the MIP optimizer is instructed to relax discrete constraints within the supply network when generating the configuration, generating a graphical user interface that includes a plurality of graphical objects corresponding to a plurality of locations included in the configuration and directional edges between the plurality of graphical objects corresponding to the flow of the materials between the plurality of locations, and displaying the graphical user interface.

18 Claims, 13 Drawing Sheets

100

(51) Int. Cl.
   G06Q 10/04        (2023.01)
   G06Q 10/087       (2023.01)

(56)                References Cited

U.S. PATENT DOCUMENTS

| | | | |
|---|---|---|---|
| 11,315,059 B1 * | 4/2022 | R | ........................ G06F 16/90344 |
| 2018/0253680 A1 * | 9/2018 | Jahani | ................. G06Q 30/0633 |
| 2020/0159806 A1 * | 5/2020 | Khurana | ................. G06F 30/20 |

OTHER PUBLICATIONS

Savelsbergh, Martin WP Preprocessing and probing techniques for mixed integer programming problems, ORSA Journal on Computing 6 No. 4, pp. 445-454, 1994, ISSN 0926 4493 https://pure.tue.nl/ws/portalfiles/portal/1878309/380251.pdf (Year: 1994).*

Jakob Witzig, Infeasibility Analysis for MIP, Berlin 2022 https://depositonce.tu-berlin.de/items/a9f13f08-fbe2-45ef-92fd-35523580e4f4 (Year: 2022).*

Hoffman et al, Improving LP-Representations of Zero-One Linear Programs for Branch-and-Cut, ORSA, v3, N2, May 1991 https://research.ebsco.com/c/kxcca7/viewer/pdf/qghum4czkb (Year: 1991).*

Python MIP Mixed-Integer Linear Programming Tools, pypi org, archives org, May 11, 2021 https://web.archive.org/web/20210511014533/https://pypi.org/project/mip/ (Year: 2021).*

IBP Supply Optimizer with Discretization horizons fails all the time, SAP community, Jun. 16-18, 2020 https://community.sap.com/t5/supply-chain-management-q-a/ibp-supply-optimizer-withdiscretization-horizons-fails-all-the-time/qaq-p/12166108 (Year: 2020).*

SAP Supply Chain Optimization, Mixed Integer Programming channels, excerpts, Sep. 29, 2024 https://www.youtube.com/watch?v=pNeCi_QJVcY (Year: 2024).*

Optimization-Based Planning, SAP webpages, Mar. 7, 2025 https://help.sap.com/doc/saphelp_scm700_ehp02/7.0.2/en-US/81/3ec95360267614e10000000a174cb4/content.htm?no_cache=true (Year: 2025).*

Local Optimization for Discrete Problems TS-Based Supply Planning, SAP webpages, Mar. 6, 2025 https://help.sap.com/docs/SAP_INTEGRATED_BUSINESS_PLANNING/feae3cea3cc549aaa9d9de7d363a83e6/7e59b838484b46888483d59089c7129e.html (Year: 2025).*

Liberti et al,Introduction to Integer Linear, LIX Ecole Polytechnique, Jul. 12, 2006 https://www.lix.polytechnique.fr/~liberti/teaching/mpri/06/ip.pdf (Year: 2006).*

Sherali et al, A reformulation linearization technique, Discrete Applied Mathematics, 157, No. 6, p. 1319-p1333, Mar. 28, 2009 https://www.sciencedirect.com/science/article/pii/S0166218X08002011 (Year: 2009).*

* cited by examiner

FIG. 3A
300A
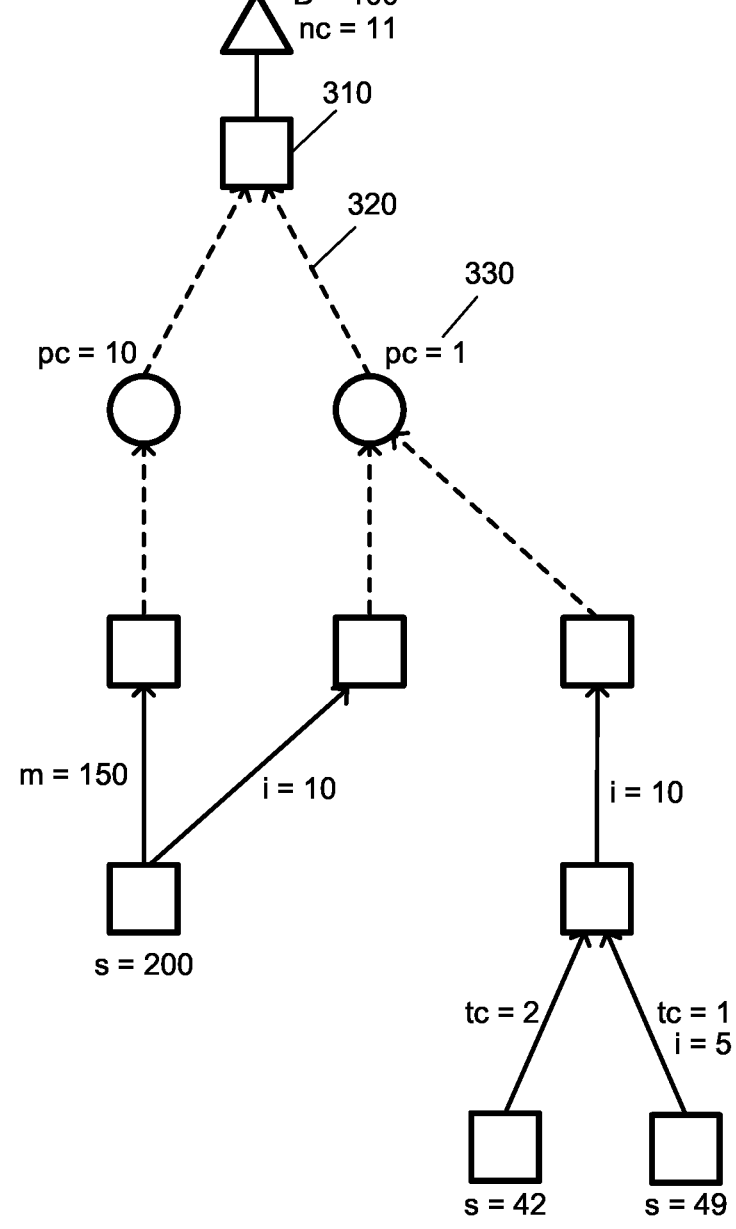

FIG. 3B
300B
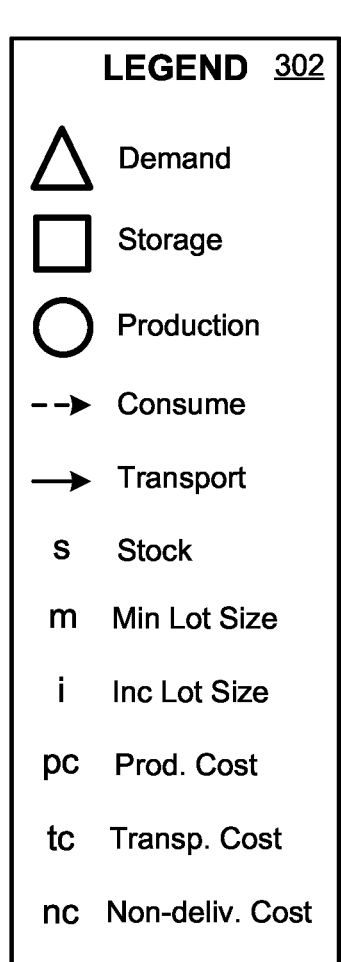
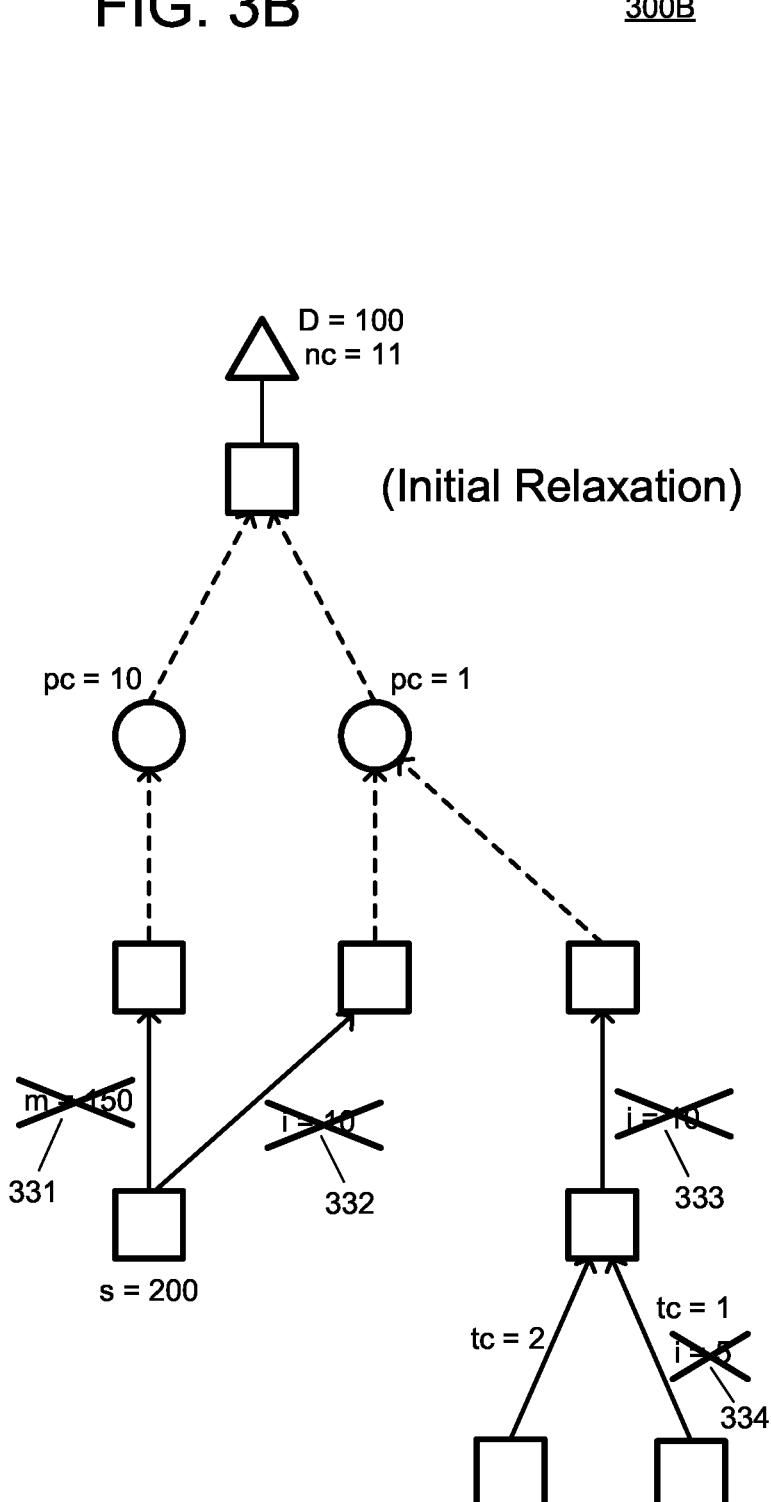
(Initial Relaxation)

FIG. 3C
<u>300C</u>
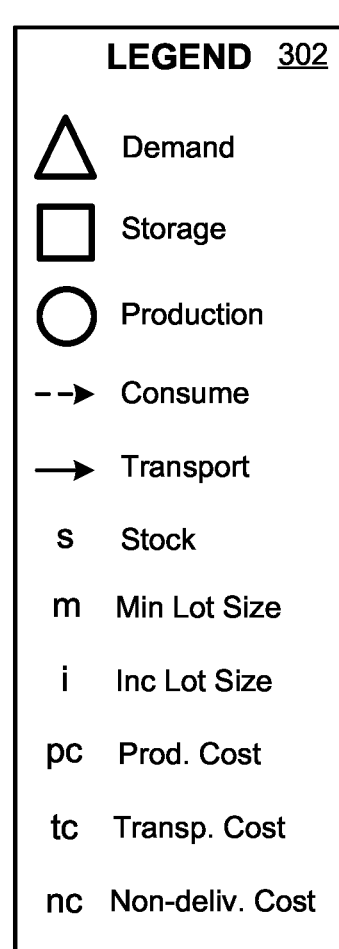
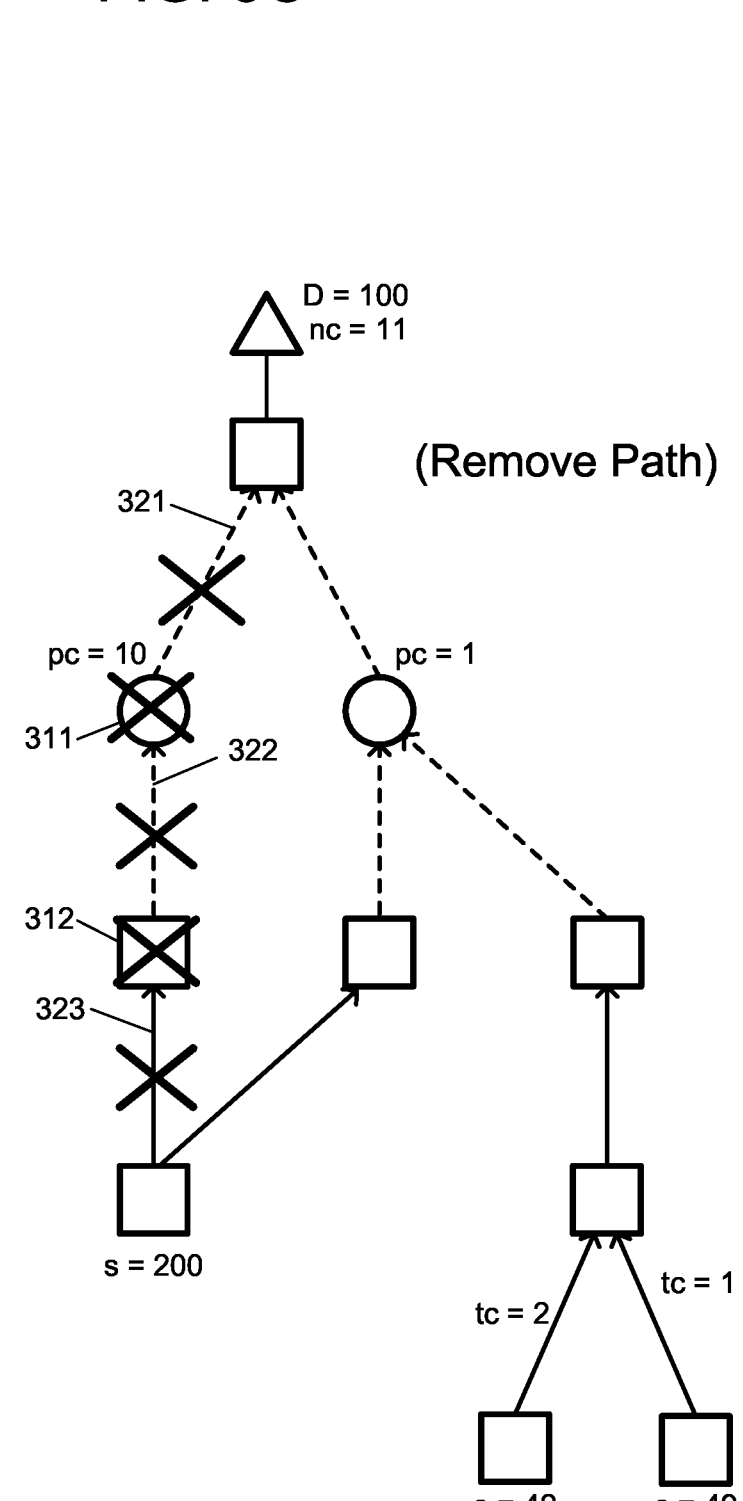
(Remove Path)

300D

LEGEND 302

△ Demand

□ Storage

○ Production

--→ Consume

→ Transport s  Stock m  Min Lot Size i  Inc Lot Size pc  Prod. Cost tc  Transp. Cost nc  Non-deliv. Cost D = 100
nc = 11

(Solve Again)

pc = 1

R = 90 (cap)

340 s = 200 tc = 2    tc = 1 s = 42    s = 49

300E

LEGEND 302

△   Demand

□   Storage

○   Production

- -→   Consume

—→   Transport s   Stock m   Min Lot Size i   Inc Lot Size pc   Prod. Cost tc   Transp. Cost nc   Non-deliv. Cost (Restrict Again and Solve)

500                    FIG. 5

SOLVING SUPPLY NETWORKS WITH DISCRETE DECISIONS

BACKGROUND

Supply chains often contain multiple entities with different production and transportation requirements. For example, three different parts manufacturers may contribute by manufacturing three different parts of a product that is assembled by a fourth manufacturer. Each of these entities may have different production requirements, transportation requirements, etc. Software solutions can be used for supply planning including modeling the interactions among these entities within the supply chains.

However, there are a lot of dimensions to consider (e.g., time, location, materials, costs, labor, etc.) and not all decisions of a specific configuration have the same impact. As a result, calculating an optimal plan of how to execute a supply chain can be very difficult. In many cases, the software (e.g., an optimizer, a solver, etc.) may not arrive at an optimal solution because it runs out of time, or it only finds a few possible options due to long running processes and time constraints.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1 is a diagram illustrating a host platform for generating an optimum solution of a supply network in accordance with an example embodiment.

Figure 2A:
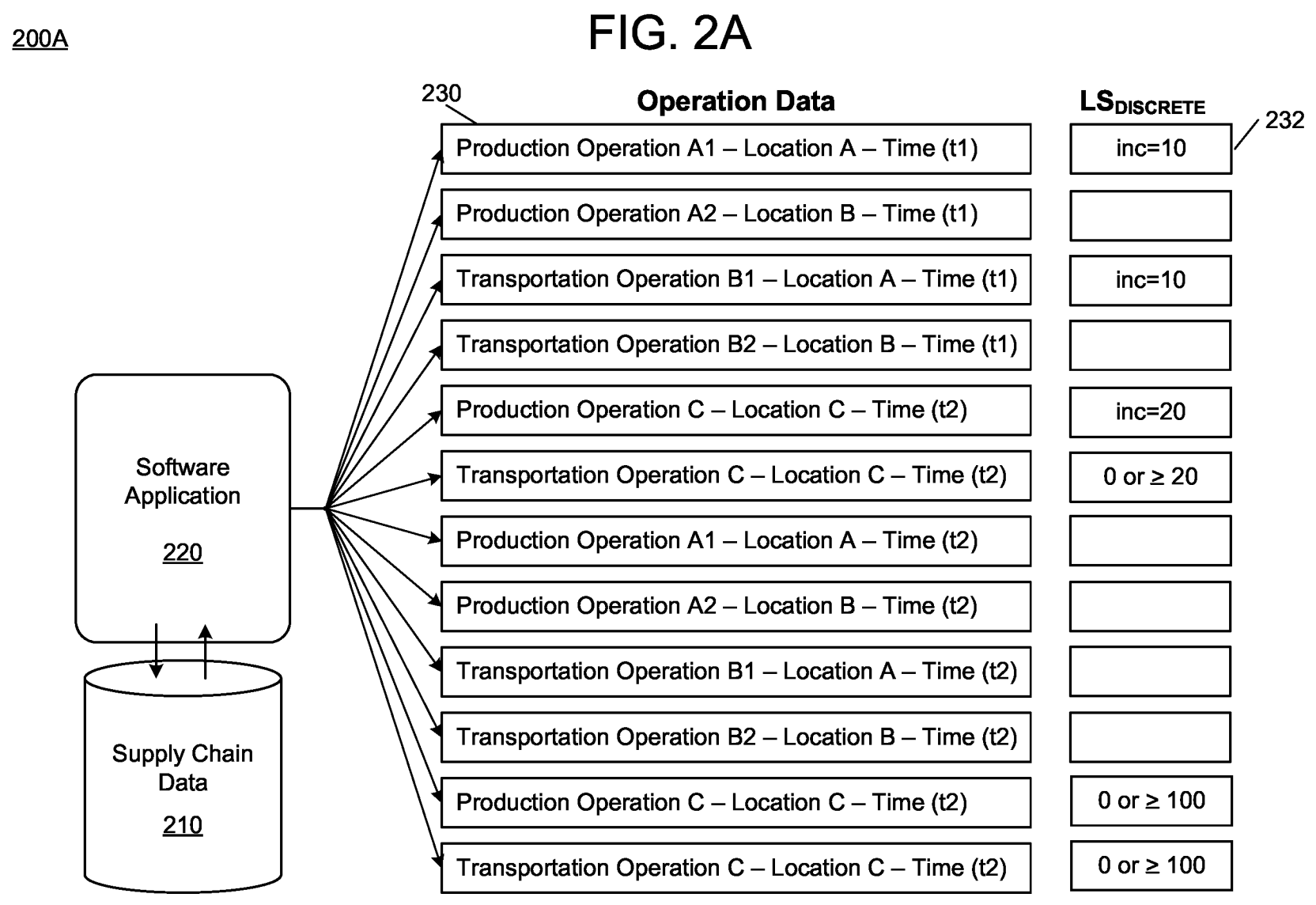

FIG. 2A is a diagram illustrating a process of identifying operational data of a supply chain in accordance with an example embodiment.

FIGS. 3A-3E are diagrams illustrating a process of generating a model of a supply network via relaxation and optimization in accordance with an example embodiment.

Figure 2B:
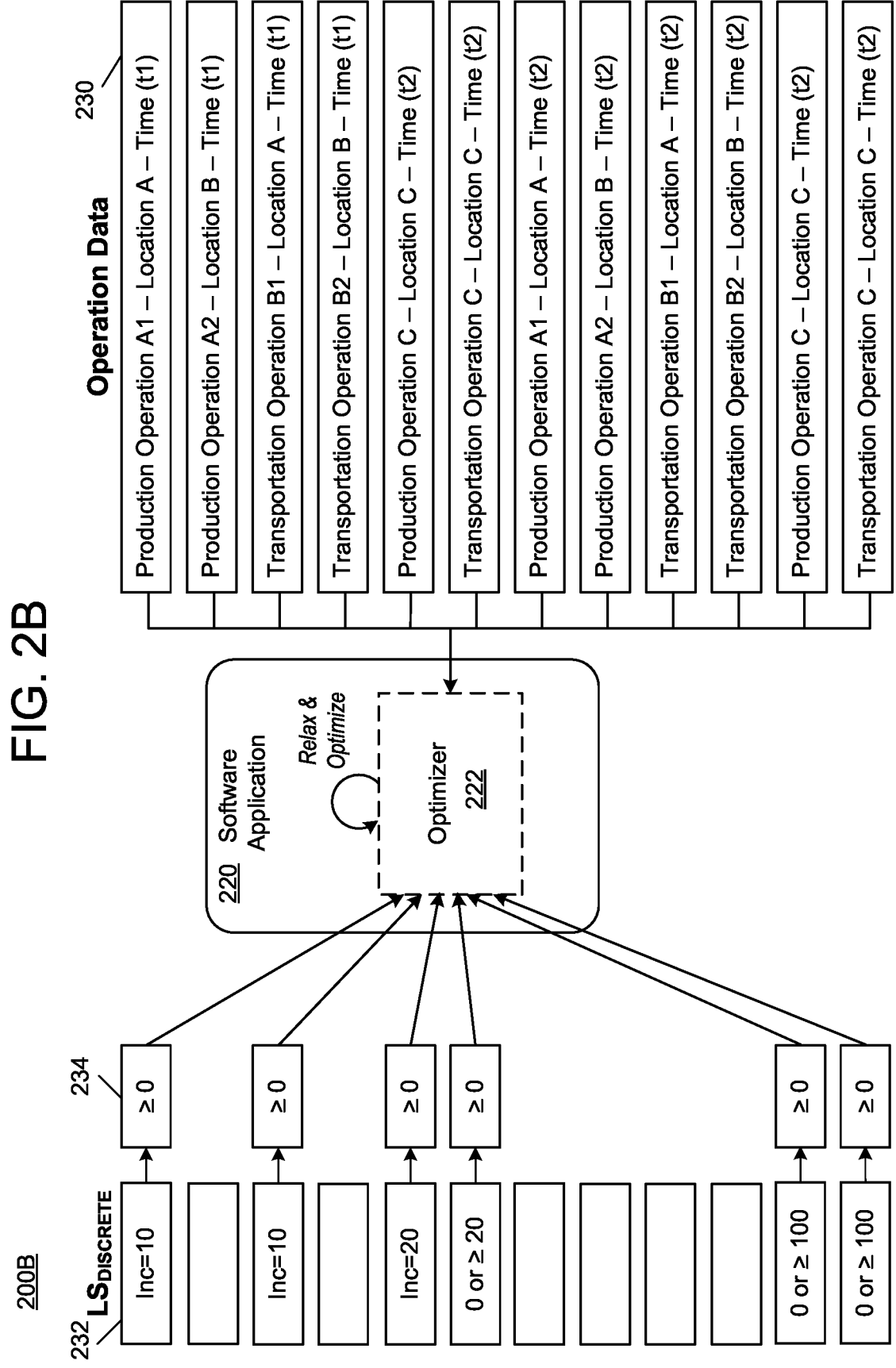
FIGS. 2B-2D are diagram illustrating a process of determining an optimal solution for a supply network via an optimizer based on the operational data identified in FIG. 2A, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

To find an optimal solution for a supply network (e.g., based on cost, production, transportation, etc.) a software application with an optimizer (e.g., a mixed integer programming (MIP) optimizer, a linear programming (LP) optimizer, or the like) may transform a model of a supply network including graphical objects and edges/directions into a mathematical model referred to as mixed integer linear program (MILP) model or mixed integer program (MP) model. The model can be "solved" using the optimizer to find an optimal "solution" for the supply network. During this process, the optimizer may execute an objective function based on various objectives (e.g., costs, etc.) to find an optimal flow of materials, parts, product, etc., through the supply network) which satisfies these objectives and is thus referred to herein as a solution. The solution can be modeled based on locations, production, transportation, and/or the like.

For example, attributes such as production, transport, external receipt/procurement, demand, inventory, and the like, may be modeled within the MILP model. For example, the model may include one or more continuous variable for one or more of production, transportation, receipt/procurement, demand, inventory, and the like. The continuous variables represent material flows and inventory situations in the supply network. The model may also include integer variables (including binary variables) such as lot size requirements (output constraints) on one or more of transportation and production and an indicator of whether fixed costs are required. The model may also include multiple periods of time, especially when some actors within the supply chain have different availability.

Traditionally, an optimizer may struggle to find an optimum solution of a supply network (e.g., a supply chain, cold chain, etc.) within a reasonable amount of time that is expected by a customer. One of the difficulties for the optimizer is constraints such as lot size restrictions which require discrete values, also known as integer output requirements. These discrete values are associated with the integer variables mentioned already including "lot size restrictions" which restrict production and transportation by requiring certain outputs. Discrete values require production to be in a natural number (e.g., N=1, N=10, N=25, N=50, N=75, N=100, etc.) where N is the required lot size of the site also referred to herein as a lot size requirement. The optimizer may solve the supply network model based on the lot size requirements, the network structure, and other attributes to determine a model of a flow of materials within the supply chain. The model of the flow of materials may include a plurality of locations corresponding to a plurality of actors in the supply chain and attributes including production attributes and transportation attributes for the plurality of locations within the supply chain. According to various embodiments, provided herein is an optimization system (e.g., a software application with an optimizer integrated therein) for a mixed integer programming (MIP) problem.

The optimizer may also be referred to as a "solver". In order to create more flexibility for the optimizer and reduce complexity, the example embodiments may instruct the optimizer to relax the discrete value requirements (binary variables within the MIP model) to have a linear requirement such as anything greater than or equal to zero. By relaxing the discrete requirement (integer decision) on the variable in the MIP model, the process creates more flexibility for the optimizer to find more possible solutions (optimal models of the supply network) in less time. For example, the linear requirements enable less restrictions during the consideration process by the optimizer.

The initial run with the discrete requirements removed/relaxed may yield an optimal supply network configuration based on various attributes such as cost, demand, supply, etc. without potentially considering the restrictions which have been relaxed. Therefore, the system may selectively impose various restrictions by removing complexity in an incremental manner and instructing the optimizer to generate an optimum configuration of the reduced/simplified supply network. At each iteration, a sub-portion of the supply network may be simplified. The portion may correspond to the operation of the supply network that has the restriction being imposed/re-imposed within the model.

In other words, the system can selectively introduce restrictions (e.g., transportation caps, production caps, storage caps, etc.) back into the model and attempt to optimize the model after each introduction. At each sub-sequence in the model, the optimizer may "solve" the sub-sequence to generate a most optimal sub-sequence. This quite often involves removing aspects from the supply chain, and does not add new aspects. Therefore, the optimization system described herein can also incrementally reduce the data considered by the optimizer at each iteration by removing dependent portions of the supply network that are not needed in a configuration of an optimal flow of the supply network.

In doing so, the solution can push the restrictions on less frequently used or less dependent aspects of the supply chain and reintroduce restrictions on the more urgent and frequently used steps, and incrementally work its way to an optimal solution that satisfies/solves predetermined requirements of the customer such as cost, efficiency, performance, or the like. For example, the optimizer may start to introduce the restrictions toward a beginning of the supply chain which has the most dependencies rather than the end of the supply chain which does not have any dependent operations, but which depends on the other operations in the supply chain.

The optimizer may rank the different operations in the supply network and start introduction of constraints for the most prioritized operation (e.g., a first operation/sequence in the chain that is earliest in the process, with the most dependencies in the process, etc.). Here, the system can instruct optimizer to find a solution that satisfies as many of the customer's requirements by selectively introducing some constraints into the relaxed model. If the optimizer reaches a point in the sequence of the supply network (e.g., between two steps, locations, operations, etc.) where it cannot find an optimal solution for the model, the optimizer may stop, but provide an output of a partial optimal supply network configuration to the customer. Then, the customer can use this information to upgrade their network to better handle their needs. The output may include a single optimized configuration of the supply network that can pinpoint which aspects of the supply network need improvement, and how such improvement can be performed from existing locations and lines of transportation within the supply network. Although dozens, hundreds, or even more optimum configurations of the supply chain may be generated during this process, the client may only receive a view of the best configuration which is selected by the system.

In addition to improving the flexibility of the optimizer and ultimately improving its ability to find solutions, the system described herein can also reduce the data that is considered by the optimizer during each subsequent iteration when solving/optimizing the MIP model of the supply network. By reducing the data, the optimization iterations become shorter in duration and more iterations can be performed to generate more possible variations of the supply network configuration. A traditional optimizer will solve the supply network based on the entire data set, at once. To do this, the optimizer will consider the entire data set at the same time including all possible options for each location, transportation, production, etc., when arriving at a final optimal solution for the entire data set. The result is a significant amount of data being processed many times.

In contrast, in the example embodiments, the optimizer may break-up the network into small sequences/segments, for example, each sequence of locations within the supply chain may be a segment that is individually considered by the optimizer. To start the optimization process, the software application may generate a mathematical model (e.g., mixed integer programming model, etc.) of the supply chain based data of the supply chain. The model may include variables and constraints (e.g., lot restrictions) that are imposed on the variables. The lot restrictions (e.g., incremental, minimum, etc.) represent different constraints within the supply chain. To generate an optimum configuration of the supply network, the system described herein may "solve" the mathematical model using a linear programming (LP) solver, a mixed-integer programming (MIP) solver, or the like.

When solving the model, the software application may command the optimizer to incrementally enforce constraints such as hard caps into the relaxed model starting with a highest priority/dependent operation of the supply network which may be at the beginning. The software application may start by imposing restrictions in an incremental manner working from the highest priority operation to the lowest priority operation. After each imposition, a new solution may be generated by the optimizer which identifies an optimal flow of materials, goods, products, parts, etc., through the supply network. The flow may include locations, production attributes, transportation attributes, dependencies, and the like. This process may be iteratively repeated with new restrictions being added into the relaxed mathematical model at each iteration and solved by the optimizer. The result is many possible configurations of the supply network that can be compared to each other based on properties therein (e.g., cost, production, etc.) to select an optimal configuration of the supply network (i.e., a best configuration based on attributes therein). The optimal configuration returned by the optimizer can be converted into a graphical user interface.

Figure 1:
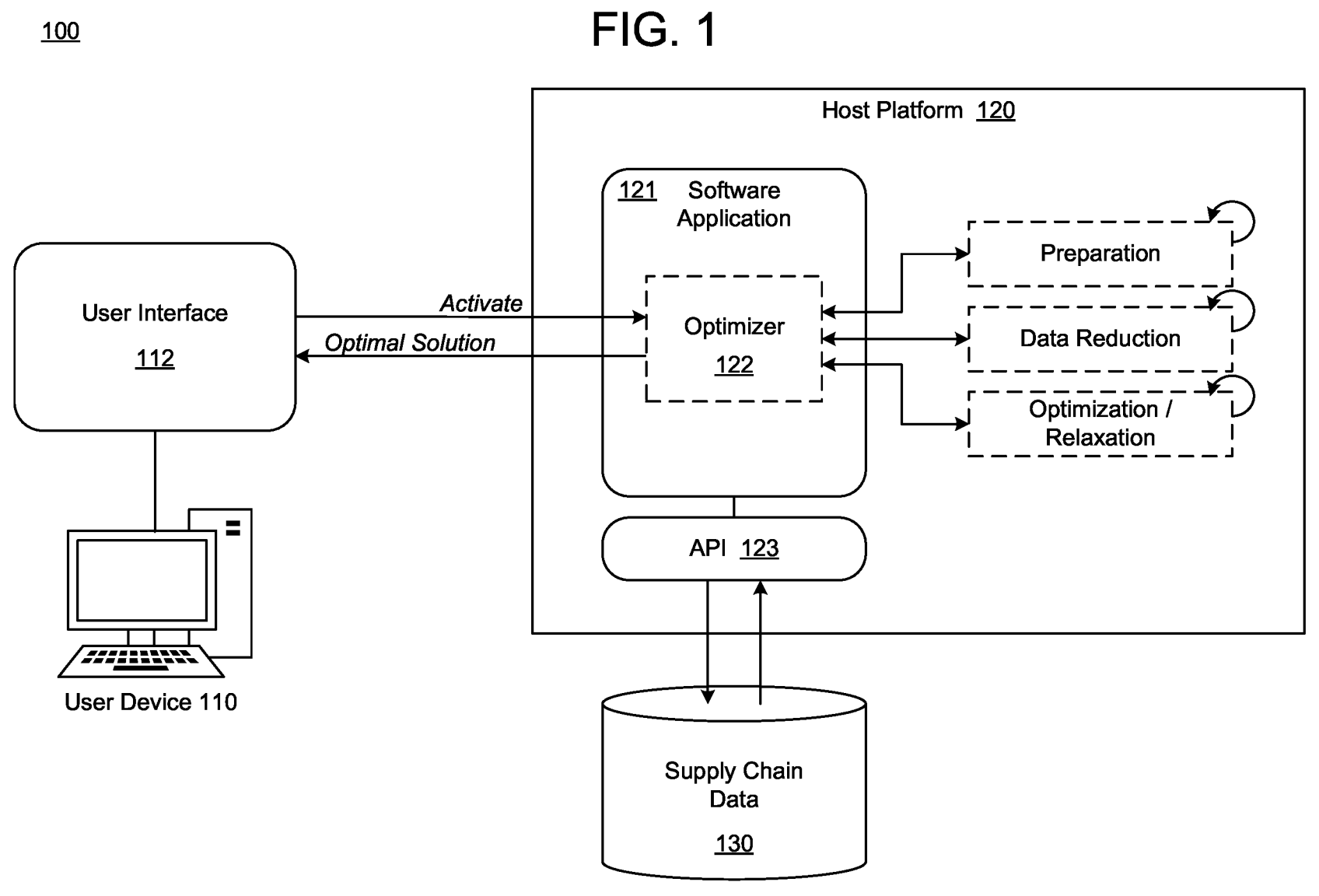

FIG. 1 illustrates an environment 100 of a host platform 120 for generating an optimum solution of a flow of materials through a supply network in accordance with an example embodiment. Referring to FIG. 1, the host platform 120 may include a cloud platform, a web server, a database, a distributed network of devices, and the like. In some embodiments, the host platform 120 may host a software application 121 for designing graphical models of supply chains (supply networks) which can be output via a graphical user interface (GUI) that is embedded within a page or pages of the software application 121. The graphical model may be embodied in a data structure such as a document, an XML file, a JSON file, or the like. The graphical model may include objects embedded within a viewing area thereof that can take the form of shapes, three-dimensional objects, symbols, lines, images, and the like. The objects can represent parties and/or locations within the supply network where operations are performed. The objects may be arranged by the software application 121 in a configuration that represents the supply network. The software application 121 may also directional lines indicating flow between the locations within the supply chain including distribution and transportation.

The graphical model may also include metadata embedded therein such as additional information about the operations that are performed at each location, the requirements/constraints of such operations such as production requirements (e.g., produce at least this much product per day, per week, per month, etc.) and transportation requirements (e.g., deliver this much product per day, per week, per month, etc.) The metadata may also identify the time period and/or order of such operations, transportation requirements, production requirements, and the like. The metadata may be stored within meta information that can be accessed by the user hovering a cursor over an object that includes the meta information.

According to various embodiments, the host platform 120 may download and install a library that includes an optimizer 122 such as a linear programming (LP) optimizer or a mixed integer programming (MIP) optimizer and incorporate the library into the software application 121. As an example, the library may be a dynamic link library (DLL) that can be called at runtime of the software application 121 to execute the optimizer 122 to perform a particular optimization task such as to optimize a supply network model. The host platform 120 also provides a URL or other network location where users can access the software application 121 over the Internet. As an example, a user open the software application 121 by navigating to a particular URL via a web browser, mobile application, or the like.

In the example of FIG. 1, a user may use a user device 110 to access the software application 121 hosted on the host platform 120 via a user interface 112 of the software application 121 that is output by the host platform 120 to the user device 110 over the Internet, or the like. In this way, the user interface 112 may be part of a front-end of the software application 121 while the host platform 120 may host a back-end of the software application 121. Here, the user may request that the software application 121 build or otherwise generate an optimum model of a supply network. Here, the user may provide data of a supply network directly to the software application 121 or provide a storage location of the data of the supply network to the software application 121. In response to receiving the storage location, the software application 121 may identify a database 130 where the user's supply chain data is stored. For example, the database 130 may be a local database at the host platform 120 or a third-party database that is accessed over a network. In either case, the host platform 120 can retrieve the data via an application programming interface (API) 123.

The data of the supply network may include tables of data that have values for locations of entities within the supply network, operations performed by the entities at those locations, transportation flow between the entities, constraints/requirements on production, constraints/requirements on transportation, and the like. With this information, the software application 121 can generate a model (graphical model) of the supply network. To do this, the software application 121 may convert the supply chain data from the database tables into a mathematical model referred to as a mixed integer program (MIP) model. The model may include variables for various aspects of the supply network including transportation, production, receipt/procurement, demand, inventory, and the like. Each variable may include a constraint added thereto. For example, a constraint may be added to the transportation variable within the MIP model that represents a requirement that at least X number of cars be produced at a particular location within the supply network every predetermined period of time (e.g., every week).

Next, the software application 121 may call the optimizer 122 to solve the MIP model generated by the software application 121. For example, the software application 121 may call or otherwise instruct the optimizer 122 during runtime of the software application 121. In response, the optimizer 122 may perform various steps on the MIP model in an attempt to generate an optimum solution for a flow of materials through the supply network. Internally, a sequence of simplified and reduced models may be iteratively created for which optimal solutions are calculated. The software application 121 may output a solution of the original model via the user interface 112. This solution is calculated by using the simplified/reduced model of the supply network Examples of generating an optimum solution are further described herein. When the model is generated, the software application 121 may output a display of the optimum model via the user interface 112.

According to various embodiments, during the process, the software application 121 may instruct the optimizer 122 to remove discrete constraints from the locations and operations within the supply network. For example, the software application 121 may instruct the optimizer 122 with a particular command. The command may control the optimizer 122 to relax the discrete restrictions assigned to the operations of the supply network such as incremental lot restrictions. These restrictions are discrete values (i.e., integer decisions, etc.) By relaxing the discrete restrictions, the discrete values become linear restrictions (e.g., less than or greater than zero). Thus, the relaxation process enables a linear solution to be generated using a linear programming (LP) optimizer/solver. The linear solution can be determined much faster than the mixed-integer solution because the discrete constraints have been removed. However, the first model may not consider all of the restrictions.

The host platform 120 may iteratively repeat the process and generate different reduced versions of the flow of materials within the supply network. To do this, the software application 121 may iteratively call the optimizer 122 to re-solve the model. Each iteration, the software application 121 may instruct the optimizer 122 to selectively impose a discrete restrictions/lot restrictions that were removed to begin with. The restrictions may be added back in incremental fashion, and the model re-solved after each new increment. The increments may start with a first sequence (between two locations, etc.) in the supply network, and work forward from the start of the supply network to the end of the supply network. By starting at the most dependent steps of the model (at the beginning) and optimizing them first, more of the difficult complexities are encountered and optimized before the less dependent operations earlier in the process. If the optimizer cannot reach a complete solution, it may output the results based on how far it has made it through the optimization process and reached a stop condition.

As another example, the optimizer 122 may generate multiple solutions for the model. This process may continue until enough solutions have been generated or a time limit has been reached. Here, the software application 121 may compare the solutions (i.e., configuration of the flow of materials within the supply network) that have been iteratively generated against each other using various cost functions, metrics, etc., and determine a best solution of the flow of materials that was generated and output the best solution via the user interface 112 of the software application 121.

FIG. 2A illustrates a process 200A of identifying operational data of a supply chain in accordance with an example embodiment. Referring to FIG. 2A, a software application 220 may retrieve supply chain data from a database 210, for example, via an API or the like. The software application may identify a plurality of operations 230 that are performed by the supply chain and attributes of the plurality of operations. The attributes may include actors that perform the operations, location of the operations, order of the operations, time periods at which the operations are to be performed, and the like. In addition, the software application 220 may also identify any discrete requirements 232 such as lot size requirements which restrict various locations on output. In particular, the lot size requirements require locations of the supply chain to produce one of two or more amounts of a product in a particular period of time (e.g., xero automobiles or more than one hundred automobiles per week, etc.) This type of lot size restriction may be represented mathematically by (0 or >=100). The lot size restrictions can be replaced with a linear constraint (e.g., >=0).

FIG. 2B illustrates a process 200B of relaxing integer constraints (discrete values) within the supply chain in accordance with an example embodiment. Referring to FIG. 2B, the software application may include an optimizer 222 such as an LP optimizer, MIP optimizer, or the like, which is installed therein via a library or some other mechanism. In this example, the software application 220 may call the optimizer 222 to generate a configuration of the supply network based on the operations 230 and the attributes thereof that are identified in the process 200A of FIG. 2A. However, before the optimizer 222 generates the optimum configuration, the software application 220 may instruct the optimizer 222 to relax the discrete requirements 232.

For example, the optimizer 222 may convert the discrete values/integer values of the discrete requirements 232 into linear constraints 234 which include essentially get rid of the lot restrictions and remove the constraints from the model. In doing so, the problem "shrinks" and becomes easier to solve thus resulting in faster process time. It may perform this conversion for all of the discrete requirements 232 to start with. In the example of FIG. 2B, there are seven discrete requirements among the discrete requirements 232. Here, the optimizer 222 can convert each of these discrete requirements 232 into linear constraints 234 that essentially place no restrictions on the lot size or the transportation size. In doing so, the solution increases the flexibility of the model to adjust to production and transportation requirements in the absence of any discrete requirements. The output result of the initial optimization process is a first solution/configuration 241 of the supply chain which is shown in FIG. 2D, and which is generated based on all of the integer value constraints converted to linear value constraints.

Figure 2C:
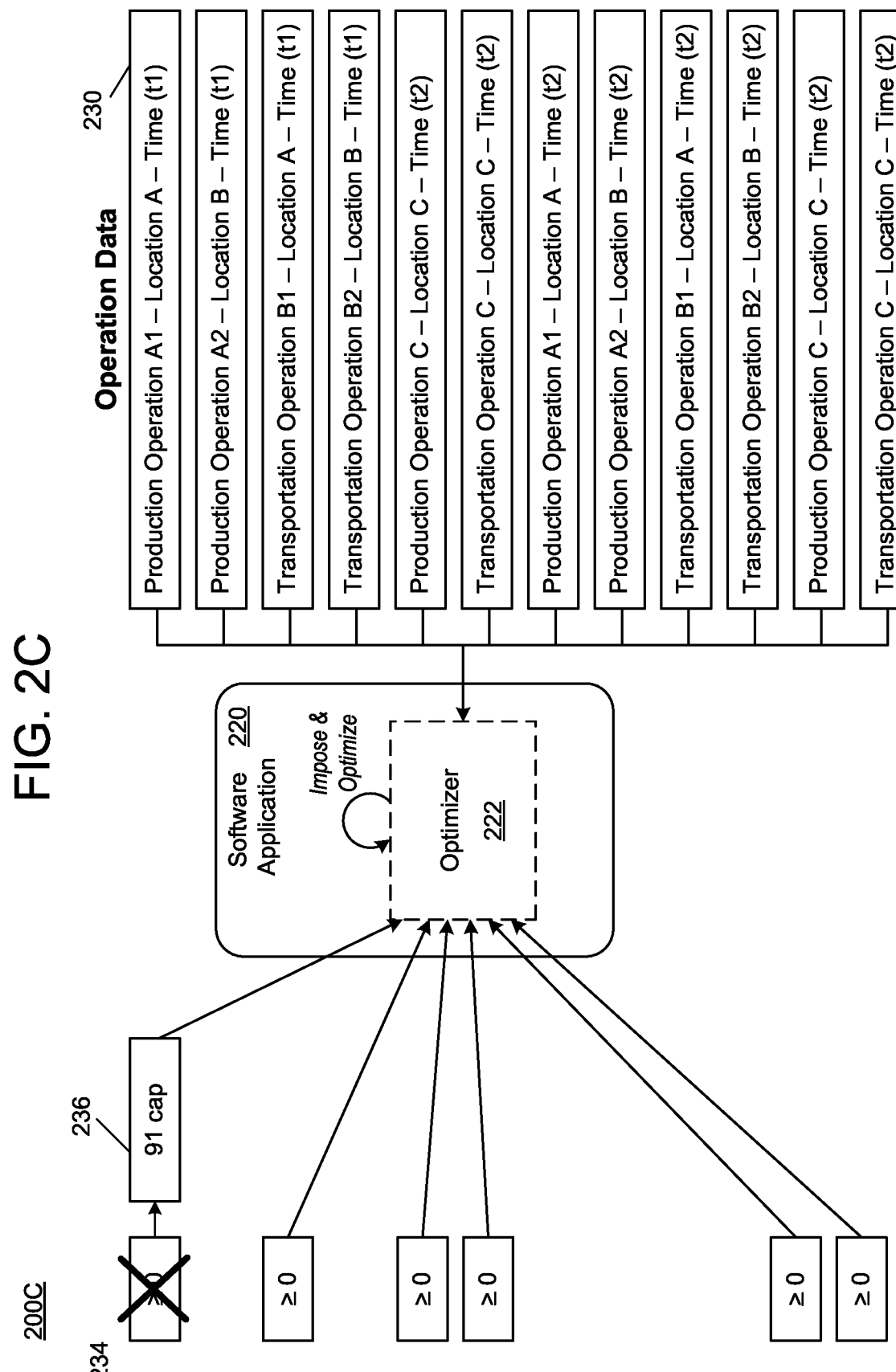
Figure 2D:
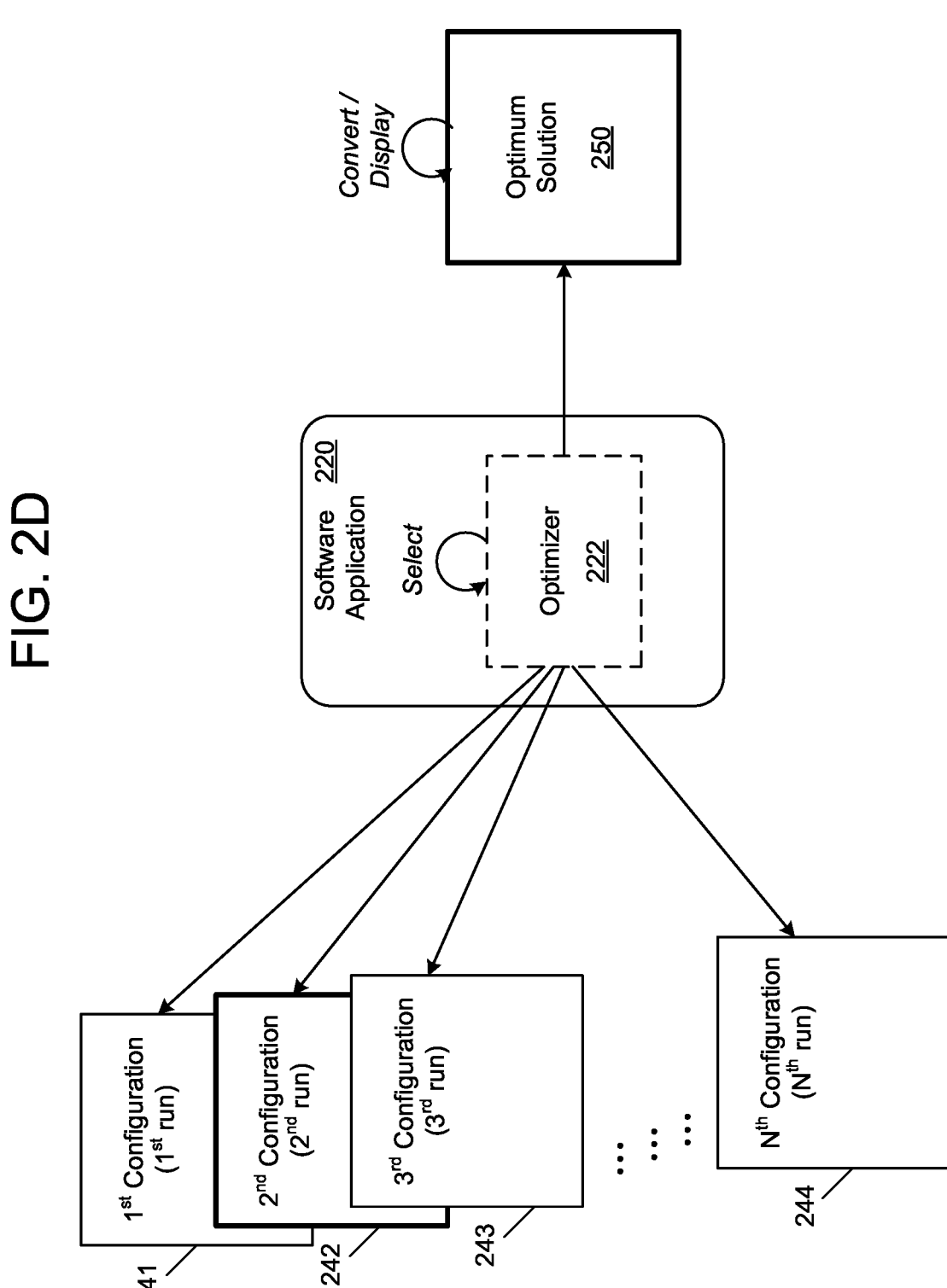

FIG. 2C illustrates a process 200C of iteratively repeating the optimization process performed in FIG. 2B. However, in FIG. 2C, the software application 220 instructs the optimizer 222 to impose one or more restrictions on various operations of the supply chain based on rankings among the operations/locations. Here, the software application 220 may analyze the supply chain network and identify a ranking among the different operations and/or locations performed within the supply chain. The ranking may be determined based on the chronological order in which the locations occur with respect to each other and the operations and dependencies within the supply chain. For example, an operation that is at the beginning of the supply chain may have the most dependencies within the supply network and may be ranked as the first operation within the relaxed model to impose the restrictions. It may also be determined based on dependencies between the operations. For example, if two operations and locations are involved at the same time period, a priority among the two could be identified if one of the two operations had more dependencies. In this case, the operation with more dependencies would be given a higher ranking and would have requirements returned to it before the other operation.

In the example of FIG. 2C, the first operation with a discrete requirement is determined to be the highest priority operation in the sequence of the model for purposes of relaxation. Because it is first in the sequence, the software application 220 may determine this operation to be the operation that has the most dependencies within the supply chain since it most if not all other steps in the supply chain will depend on the first step. Accordingly, the software application 220 can instruct the optimizer 222 to re-impose restrictions on the first operation as a linear constraint 234. The imposed requirement may include a constraint on the production and/or the transportation (incremental lot size requirement) that was previously part of the location's operations. In particular, the system caps the possible lot size requirements such that anything over 90 (e.g., 91 and above) is forbidden from consideration. The software application 220 may send a command to the optimizer 222 which commands the optimizer 222 to impose a requirement 236. Furthermore, the software application 220 may trigger/instruct the optimizer 222 to generate a $2^{nd}$ configuration 242 of the supply network during a second run. Here, the $2^{nd}$ configuration 242 may be based on the discrete requirements 232 removed with the requirement 236 requirement returned for the first operation in the supply network.

The software application 220 and the optimizer 222 may repeat the process performed in FIG. 2C for N number of times, where N is a natural number. The number of times may be dependent on a time frame or it may be dependent on a comparison of the reduced model to predefined constraints for costs, production, transportation, or the like. For example, as shown in FIG. 2D, multiple configurations 241, 242, 243, . . . 244 have been generated. To do this, the optimizer may incrementally return restrictions back into the network based on the ranking determined. The software application 220 may compare the different solutions to each other to determine an optimal solution 250 based on one or more attributes such as cost, performance, efficiency, complexity, and the like.

Figure 3D:
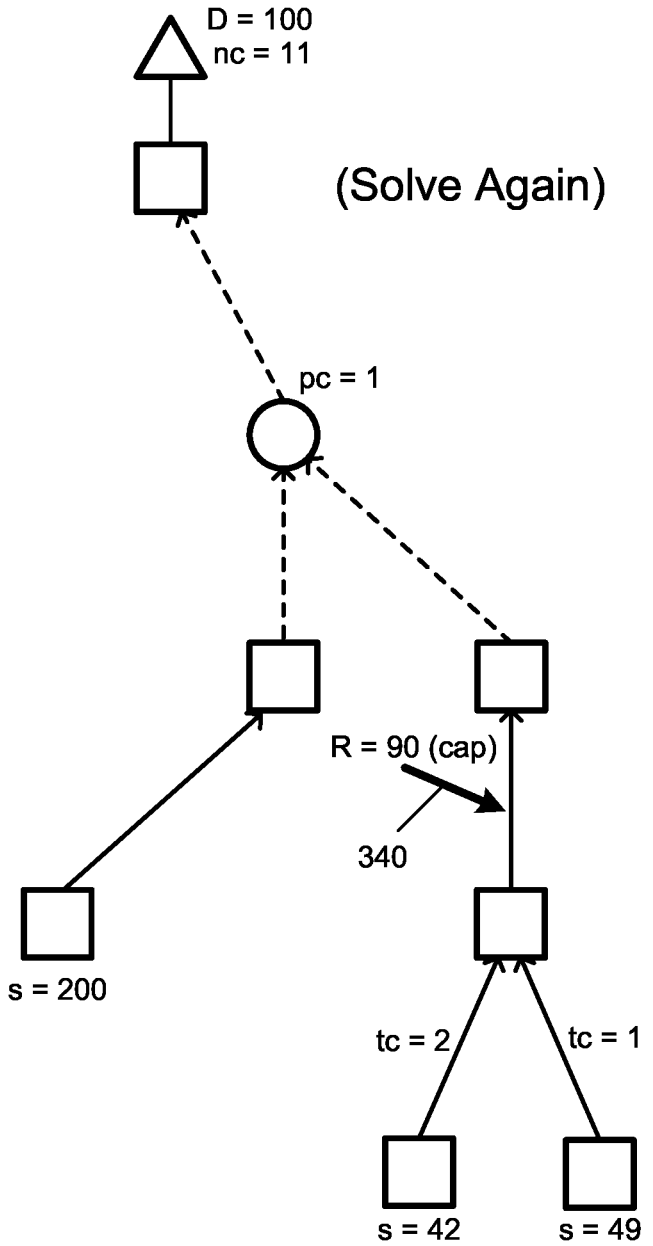

FIGS. 3A-3E illustrate a process of generating a solution for a supply network via relaxation and optimization in accordance with an example embodiment. FIG. 3A illustrates a logical depiction of a model of a supply network. In this example, the model is a logical representation of the supply network, and it may be encoded within a mixed-integer programming (MIP) model. The MIP model may be generated by an MIP optimizer. The first view 300A also includes a legend 302 with a mapping of objects in the model to their meaning in the supply network. During a first run of the optimizer, the network model may be reduced by removing non-optimal locations, operations, and the like resulting in a shrunken model that is used during subsequent iterations of the optimizer. By shrinking the model (i.e. removing parts of the supply network), the optimizer has less data to process and can find a solution faster in comparison to the entire model of the supply network before the shrinking.

In FIG. 3A, the first view 300A of the model includes a plurality of nodes 310 with different shapes and sizes corresponding to different operations in the supply chain including production, transportation, and storage. Each of the different operations are represented with different shapes for ease of understanding. The model also includes a plurality of lines or edges 320 which interconnect the different shapes. The edges indicate dependencies in the supply network. For example, a direction arrow branching off a first object in the model and pointing at a second object in the model indicates that the second object is dependent on the first object. That is, the operations/location corresponding to the second object depend on something such as transportation, production, and/or storage from the operations/locations corresponding to the first object. The model also includes values of metadata 330 with the initial restrictions and other constraints on the operations and locations within the model. The constraints may be lot size restrictions such as incremental lot size restriction, a minimal lot size restriction, or the like.

This initial model shown in FIG. 3A may represent the MIP model of the original supply network that is generated by the software application 121 in FIG. 1. FIG. 3B illustrates a view 300B of "relaxed" discrete values within the restrictions on the model. In particular, discrete requirements 331, 332, 333, and 334 (lot size restrictions such as incremental and minimal lot size) may be removed from the model. To do so, the host application may instruct the optimizer to convert the discrete requirements 331, 332, 333, and 334 into linear requirements (e.g., where any natural number will be a valid solution). The conversion essentially removes integer decisions from the model of the supply chain resulting in less complexity and an easier solution for the optimizer.

After the discrete requirements 331, 332, 333, and 334 have been removed from the model, the system may instruct the optimizer to "solve" the model to generate an optimal model of the supply chain. Based on the solving by the optimizer, the optimizer may identify optimum operations, locations, paths, etc., within the supply network and identify non-optimal operations, locations, paths, etc., within the supply chain. Here, the optimizer may remove any operations, locations, paths, etc., within the supply chain when generating the optimum model. For example, FIG. 3C illustrates a view 300C of a suggested optimization made by the optimizer.

In this example, the optimizer has identified storage operations 311 and 312, consumption operations 321 and 322, and transportation operation 323 as not necessary for generating an optimal solution. Here, the system can remove these non-optimal operations from the model thereby "shrinking" the model because less data and less decisions are considered for the remaining steps of the optimization process including the iterative imposition of restrictions. In this case, the optimizer may "solve" the model again but may impose a new restriction into the model that attempts to return some of the restrictions that were taken out to begin with. To do this, the optimizer ranks the operations within the supply chain based on the order in which they occur and the dependencies of the operations. The operation with the most dependencies may be assigned the highest ranking or priority, however, other criteria may be used such as chronological order, location, and/or the like.

FIG. 3D illustrates a view 300D of the model with the paths and operations removed and a new constraint 340 imposed. In the example of FIG. 3D, the optimizer is instructed by the software application to impose a hard cap value on an incremental lot size of a transport operation which is embodied as the new constraint 340. The optimizer may start with the most prioritized operation and/or location within the model, impose a restriction on the most prioritized operation, and solve the model with the discrete values removed but the single restriction imposed on the most prioritized operation. The result is another optimum model being generated. This process may continue on an iterative basis. At each iteration, the optimizer may impose a new constraint/restriction into the model based on the solving that occurs. For example, . . . .

Figure 3E:
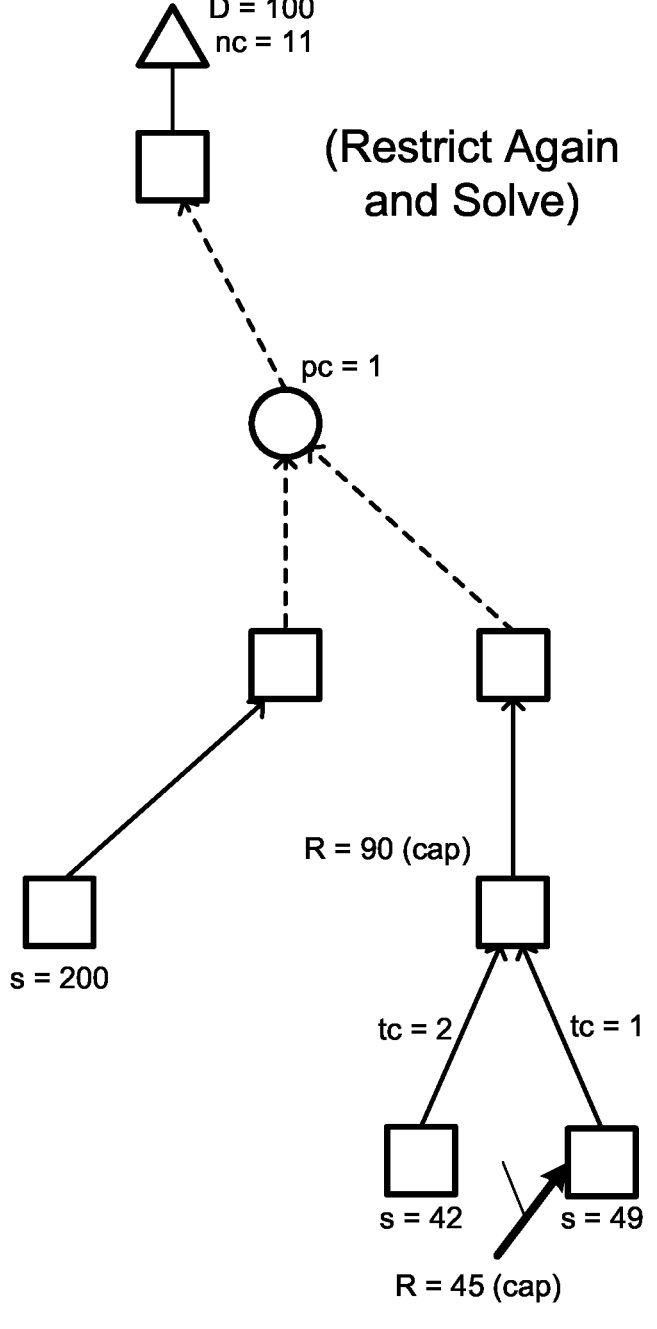

FIG. 3E illustrates a view 300E of the model with one or more additional constraints 350 added. The one or more additional constraints 350 may be added incrementally with respect to the new constraint 340. In particular, the one or more additional constraints 350 may be imposed on the next highest prioritized operation(s) with the supply network. The model may be solved again to generate another optimum model of the supply network which includes the relaxed restrictions that were imposed during the initial run, the new constraint 340 imposed during the next run, and the one or more additional constraints 350 imposed during an additional run following the next run. This process may be iteratively repeated any number of times as desired or until a timer or predetermined stop condition is reached such as a predetermined number of models being generated, etc.

Figure 4:
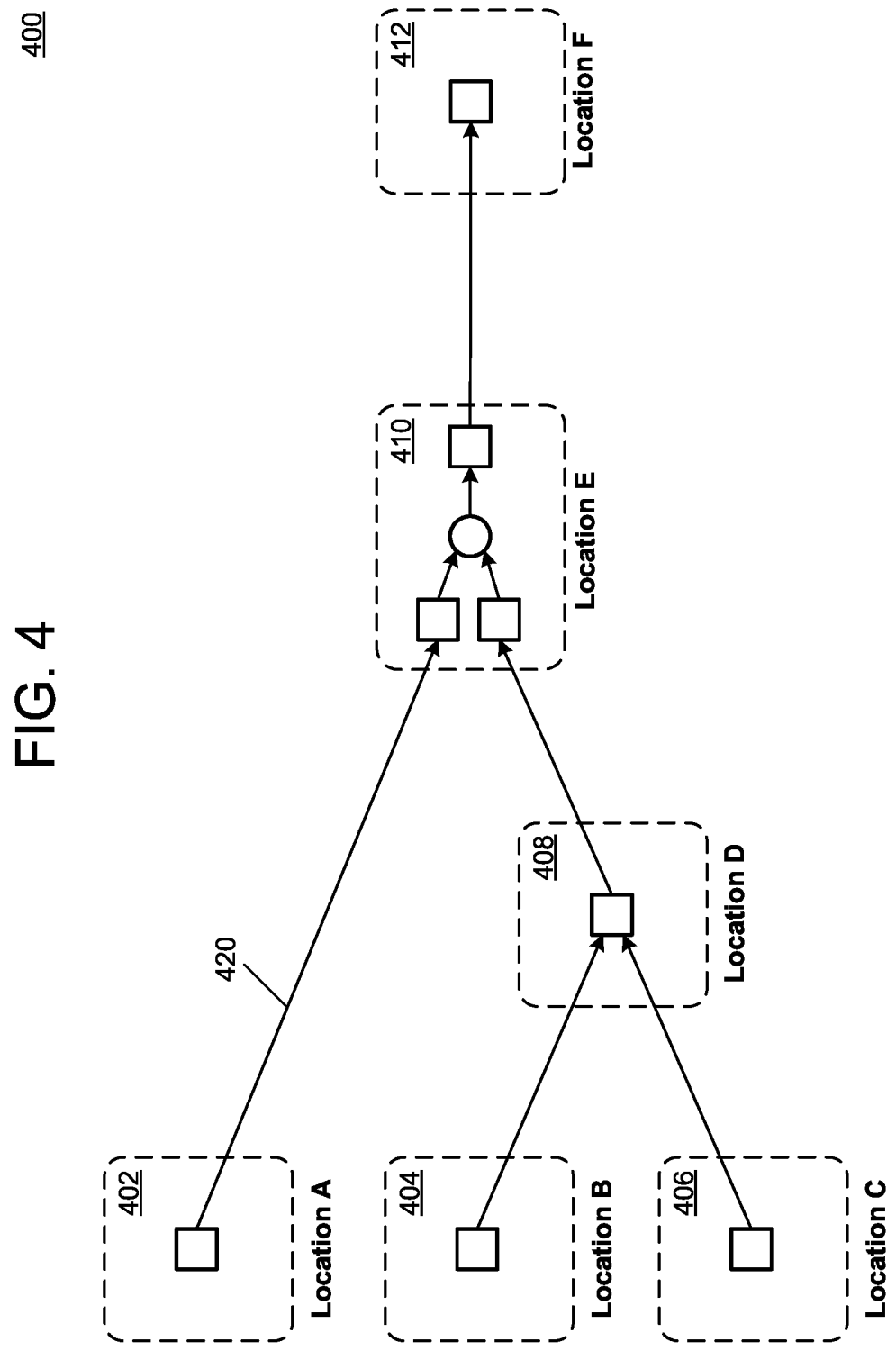
FIG. 4 is a diagram illustrating a display of the reduced model generated from the process of FIGS. 3A-3G, in accordance with example embodiments.

The final resulting model generated during the process described with respect to FIGS. 3A-3G may be converted into a graphical display and output via a graphical user interface 400 as shown in FIG. 4. For example, each of the locations 402, 404, 406, 408, 410, and 412 within the optimum supply network model may be assigned visual elements such shapes, objects, lines, bold lines, dashed lines, directional arrows/lines, shading, highlighting, boxes, colors, and the like. The locations 402, 404, 406, 408, 410, and 412 may be interconnected by directional edges 420 which indicate the direction of transportation. The system may have a predefined format for each element within the model when displaying the model on the graphical user interface 400.

Figure 5:
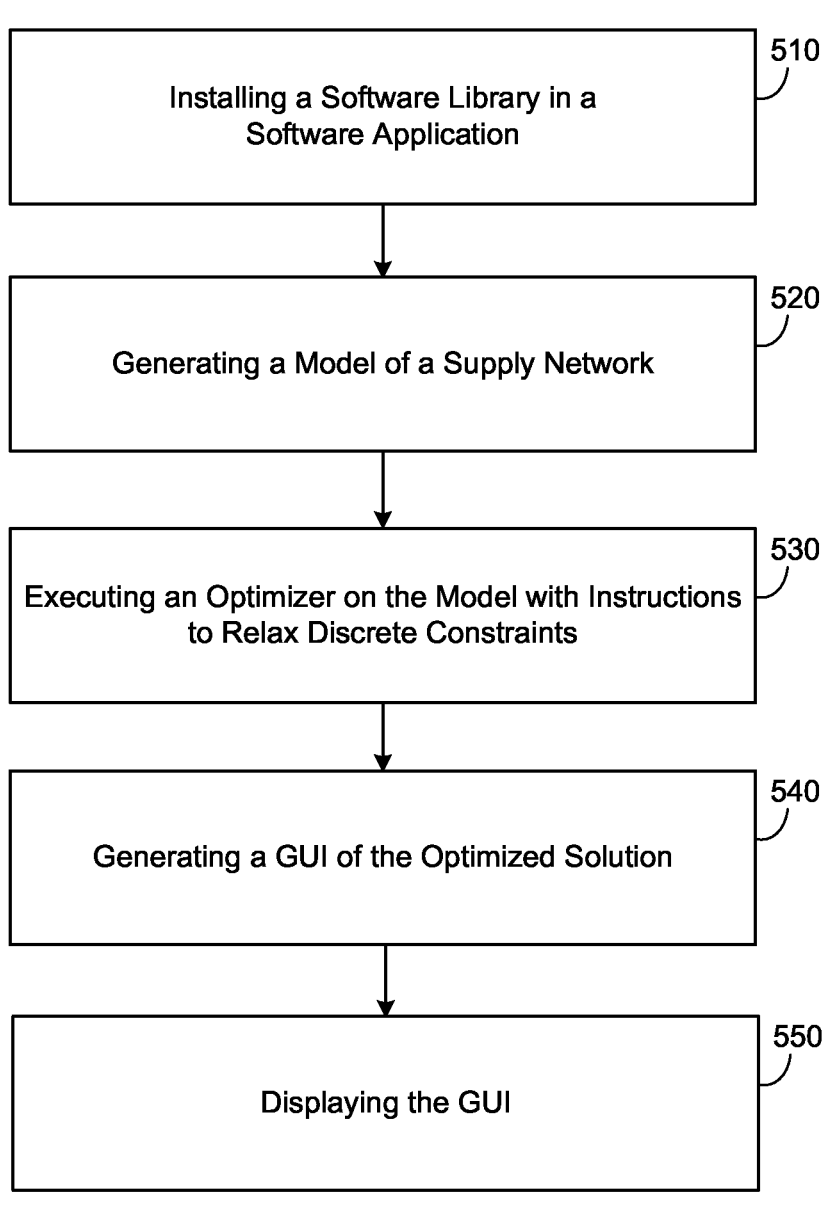
FIG. 5 is a diagram illustrating a method of generating an optimal solution for a supply network in accordance with an example embodiment.

FIG. 5 illustrates a method 500 of generating an optimal solution for a supply network model in accordance with an example embodiment. For example, the method 500 may be performed by a software application hosted by a host platform such as a cloud platform, a web server, a distributed system, a database, or the like. Referring to FIG. 5, in 510, the method may include installing a library within a software application. For example, the library may contain one or more optimizers (e.g., solvers) therein. As an example, the optimizer may be a linear programming (LP) optimizer, a mixed-integer programming (MIP) optimizer, or the like.

In 520, the method may include generating, via the software application, a model of the supply network based on the data stored in the storage device. In 530, the method may include executing a mixed integer programming (MIP) optimizer from within the installed library on the model to generate a configuration of a flow of materials within the supply network, wherein the executing comprises instructing the MLP optimizer to relax discrete constraints within the supply network when generating the configuration. In 540, the method may include generating a graphical user interface that includes a plurality of graphical objects corresponding to a plurality of locations included in the configuration and directional edges between the plurality of graphical objects corresponding to the flow of the materials between the plurality of locations. In 550, the method may include displaying the graphical user interface within a page of the software application.

In some embodiments, the method may further include identifying an operation from among the operations within the model of the supply network to impose a restriction based on an order of the operation with respect to other operations. In some embodiments, the method may further include executing the MIP optimizer again on the model to generate a second configuration of a flow of materials within the supply network, wherein the executing again comprises instructing the MIP optimizer to enforce the restriction on the identified operation and relax restrictions on the other operations when determining the second configuration.

In some embodiments, the method may further include selecting an optimum configuration from among the configuration and the second configuration based on a comparison of properties of the configuration to the second configuration, and displaying a graphical user interface of the selected optimum configuration via the user interface. In some embodiments, the installing may include installing a dynamically loaded (DL) library which includes the MIP optimizer within the software application at runtime of the software application.

In some embodiments, the executing may include calling the MIP optimizer via a predefined command that is issued via the software application to the installed library. In some embodiments, the executing may include iteratively executing the MIP optimizer to iteratively select optimal sub-sequences of the flow of the materials within the supply network until all sub-sequences of the flow of the materials are generated or an optimal solution cannot be found for a sub-sequence by the optimizer. In some embodiments, the executing may further include shrinking the model of the supply network during an iteration of the MIP optimizer, and executing the MIP optimizer on the shrunken model of the supply network during a next iteration of the MIP optimizer.

Figure 6:
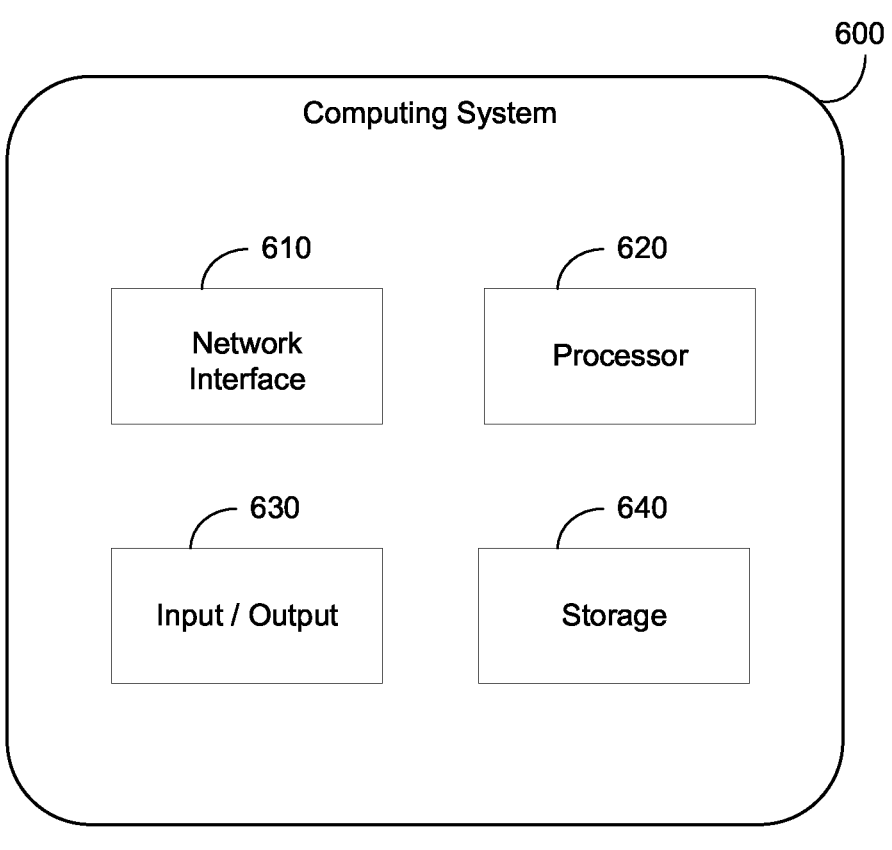
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the methods described herein. According to various embodiments, the storage 640 may include a data store having a plurality of tables, records, partitions and sub-partitions. The storage 640 may be used to store database records, documents, entries, and the like.

According to various embodiments, the storage 640 may be configured to store a mixed integer programming (MIP) model of a supply network via a software application, wherein the MIP model comprises a model of operations that are performed at a plurality of locations over a period of time, and integer constraints on the operations.

The processor 620 may be configured to install a library within a software application. The processor 620 may be configured to generate, via the software application, a model of the supply network based on the data stored in the storage device. The processor 620 may execute a mixed integer programming (MIP) optimizer from within the installed library on the model to generate a configuration of a flow of materials within the supply network, wherein the processor instructs the MIP optimizer to relax discrete constraints within the supply network when generating the configuration. The processor 620 may generate a graphical user interface that includes a plurality of graphical objects corresponding to a plurality of locations included in the configuration and directional edges between the plurality of graphical objects corresponding to the flow of the materials between the plurality of locations. The processor 620 may display the graphical user interface within a page of the software application.

According to various embodiments, the processor 620 may generate a graphical user interface that includes a plurality of graphical objects corresponding to a plurality of locations included in the optimized MIP model and directional edges between the plurality of graphical objects corresponding to flow between the plurality of locations identified from the optimized MIP model. Furthermore, the processor 620 may identify a difference between operations in the optimized MIP model and the operations in the stored MIP model. Furthermore, the processor 620 may display the graphical user interface and the identified difference within a page of the software application.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory medium. The article of manufacture containing the computer code may be made and/or used by executing the code directly from one medium, by copying the code from one medium to another medium, or the like.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, storage, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a storage device configured to store data of a supply network; and
a processor configured to:
install a dynamic link library within a software application;
call the dynamic link library at runtime of the software application to execute a mixed-integer programming (MIP) model of the supply network with discrete constraints based on the data stored in the storage device;
execute a mixed integer programming (MIP) optimizer from within the installed dynamic link library on the MIP model to generate a flow configuration within the supply network, by instructing the MIP optimizer to convert the discrete constraints within the supply network into linear constraints prior to generating the flow configuration, wherein the discrete constraints are converted to the linear constraints by removing specific discrete constraints corresponding to times necessary to find respective optimal solutions, locations within the supply network, and operations within the MIP model;
segment the supply network into a plurality of sequences of the flow configuration, each of the plurality of sequences being segmented individually by the MIP optimizer and corresponding to a particular location of the locations within the supply network;
identify, at a beginning of the supply network, a first removed discrete constraint as having a highest priority by having most dependent operations in the flow configuration of the supply network as compared to other discrete constraints on the supply network that have less dependent operations than the highest priority identified first removed discrete constraint;
incrementally remove the other discrete constraints on the supply network by relaxing binary variable values within the MIP model that correspond to the other discrete constraints, wherein the relaxed binary variable values become a linear requirement of greater than zero, resulting in shrinking the supply network and increasing flexibility for the MIP optimizer to find particular ones of the respective optimal solutions of the supply network in less time than the times necessary to find the respective optimal solutions;
re-introduce a subset of the particular ones of the discrete constraints into the MIP model with relaxed binary variable requirements, the re-introduction starting, at each iteration, with the identified first removed discrete constraint having the highest priority at the beginning of the supply network being re-introduced before incremental re-introduction of the less dependent operations, the incremental re-introduction proceeding forward from the beginning of the supply network until end of the supply network;
re-execute the MIP optimizer with the re-introduced subset of the particular ones of the discrete constraints to generate an updated flow configuration;
output, by the MIP optimizer in a case the MIP optimizer cannot reach a complete solution by a stop condition defined by a timeout limit, results of how far the MIP optimizer has reached in finding the optimal solution;
generate a graphical user interface that includes a plurality of graphical objects corresponding to a plurality of the locations included in the updated flow configuration and directional edges between the plurality of graphical objects corresponding to the updated flow configuration; and
display the graphical user interface of the updated flow configuration within a page of the software application.

2. The computing system of claim 1, wherein the processor is further configured to identify an operation from among the operations within the supply network to impose a restriction based on an order of the operation with respect to other operations.

3. The computing system of claim 2, wherein the processor is further configured to execute the MIP optimizer again on the MIP model to generate a second flow configuration within the supply network, wherein the processor instructs the MIP optimizer to enforce the restriction on the identified operation and permit linear constraints on the other operations when determining the second flow configuration.

4. The computing system of claim 3, wherein the processor is further configured to select an optimum configuration from among the flow configuration and the second flow configuration based on a comparison of properties of the flow configuration to the second flow configuration, and display the graphical user interface of the selected optimum configuration via the graphical user interface.

5. The computing system of claim 1, wherein the processor is configured to call the MIP optimizer via a predefined command that is issued via the software application to the installed dynamic link library.

6. The computing system of claim 1, wherein the processor is configured to iteratively execute the MIP optimizer to iteratively select optimal sub-sequences of the flow configuration within the supply network until all sub-sequences of the flow configuration are generated or an optimal solution cannot be found for a sub-sequence by the optimizer.

7. The computing system of claim 6, wherein the processor is further configured to shrink the supply network during an iteration of the MIP optimizer, and execute the MIP optimizer on the shrunken supply network during a next iteration of the MIP optimizer.

8. A method comprising:

installing a dynamic library within a software application;

calling the dynamic link library at runtime of the software application to execute a mixed-integer programming (MIP) model of a supply network with discrete constraints based on data stored in a storage device;

executing a mixed integer programming (MIP) optimizer from within the installed dynamic link library on the model to generate a flow configuration within the supply network, by instructing the MIP optimizer to convert the discrete constraints within the supply network into linear constraints prior to generating the configuration, wherein the discrete constraints are converted to the linear constraints by removing specific discrete constraints corresponding to times necessary to find respective optimal solutions, locations within the supply network, and operations within the MIP model;

segmenting the supply network into a plurality of sequences of the flow configuration, each of the plurality of sequences being segmented individually by the MIP optimizer and corresponding to a particular location of the locations within the supply network;

identifying, at a beginning of the supply network, a first removed discrete constraint as having a highest priority by having most dependent operations in the flow configuration of the supply network as compared to other discrete constraints on the supply network that have less dependent operations than the highest priority identified first removed discrete constraint;

incrementally removing the other discrete constraints on the supply network by relaxing binary variable values within the MIP model that correspond to the other discrete constraints, wherein the relaxed binary variable values become a linear requirement of greater than zero, resulting in shrinking the supply network and increasing flexibility for the MIP optimizer to find particular ones of the respective optimal solutions of the supply network in less time than the times necessary to find the respective optimal solutions;

re-introducing a subset of the particular ones of the discrete constraints into the MIP model with relaxed binary variable requirements, the re-introduction starting, at each iteration, with the identified first removed discrete constraint having the highest priority at the beginning of the supply network being re-introduced before incremental re-introduction of the less dependent operations, the incremental re-introduction proceeding forward from the beginning of the supply network until end of the supply network;

re-executing the MIP optimizer with the re-introduced subset of the particular ones of the discrete constraints to generate an updated flow configuration;

outputting, by the MIP optimizer in a case the MIP optimizer cannot reach a complete solution by a stop condition defined by a timeout limit, results of how far the MIP optimizer has reached in finding the optimal solution;

generating a graphical user interface that includes a plurality of graphical objects corresponding to a plurality of the locations included in the updated flow configuration and directional edges between the plurality of graphical objects corresponding to the updated flow configuration; and displaying the graphical user interface of the updated flow configuration within a page of the software application.

9. The method of claim 8, wherein the method further comprises identifying an operation from among the operations within the supply network to impose a restriction based on an order of the operation with respect to other operations.

10. The method of claim 9, wherein the method further comprises executing the MIP optimizer again on the MIP model to generate a second flow configuration within the supply network, wherein the executing again comprises instructing the MIP optimizer to enforce the restriction on the identified operation and permitting linear constraints on the other operations when determining the second flow configuration.

11. The method of claim 10, wherein the method further comprises selecting an optimum configuration from among the flow configuration and the second flow configuration based on a comparison of properties of the flow configuration to the second flow configuration, and displaying the graphical user interface of the selected optimum configuration via the graphical user interface.

12. The method of claim 8, wherein the executing comprises calling the MIP optimizer via a predefined command that is issued via the software application to the installed dynamic link library.

13. The method of claim 8, wherein the executing comprises iteratively executing the MIP optimizer to iteratively select optimal sub-sequences of the flow configuration within the supply network until all sub-sequences of the configuration flow are generated or an optimal solution cannot be found for a sub-sequence by the optimizer.

14. The method of claim 13, wherein the executing further comprises shrinking the supply network during an iteration of the MIP optimizer, and executing the MIP optimizer on the shrunken supply network during a next iteration of the MIP optimizer.

15. A computer-readable medium comprising instructions which when executed by a processor cause a computer to perform a method comprising:

installing a dynamic library within a software application;

calling the dynamic link library at runtime of the software application to execute a mixed-integer programming (MIP) model of a supply network with discrete constraints based on data stored in a storage device;

executing a mixed integer programming (MIP) optimizer from within the installed dynamic link library on the model to generate a flow configuration within the supply network, by instructing the MIP optimizer to convert the discrete constraints within the supply network into linear constraints prior to generating the configuration, wherein the discrete constraints are converted to the linear constraints by removing specific discrete constraints corresponding to times necessary to find respective optimal solutions, locations within the supply network, and operations within the MIP model;

segmenting the supply network into a plurality of sequences of the flow configuration, each of the plurality of sequences being segmented individually by the MIP optimizer and corresponding to a particular location of the locations within the supply network;

identifying, at a beginning of the supply network, a first removed discrete constraint as having a highest priority by having most dependent operations in the flow configuration of the supply network as compared to other discrete constraints on the supply network that have less dependent operations than the highest priority identified first removed discrete constraint;

incrementally remove the other discrete constraints on the supply network by relaxing binary variable values within the MIP model that correspond to the other discrete constraints, wherein the relaxed binary variable values become a linear requirement of greater than zero, resulting in shrinking the supply network and increasing flexibility for the MIP optimizer to find particular ones of the respective optimal solutions of the supply network in less time than the times necessary to find the respective optimal solutions;

re-introducing a subset of the particular ones of the discrete constraints into the MIP model with relaxed binary variable requirements, the re-introduction starting, at each iteration, with the identified first removed discrete constraint having the highest priority at the beginning of the supply network being re-introduced before incremental re-introduction of the less dependent operations, the incremental re-introduction proceeding forward from the beginning of the supply network until end of the supply network;

re-executing the MIP optimizer with the re-introduced subset of the particular ones of the discrete constraints to generate an updated flow configuration;

outputting, by the MIP optimizer in a case the MIP optimizer cannot reach a complete solution by a stop condition defined by a timeout limit, results of how far the MIP optimizer has reached in finding the optimal solution;

generating a graphical user interface that includes a plurality of graphical objects corresponding to a plurality of the locations included in the updated flow configuration and directional edges between the plurality of graphical objects corresponding to the updated flow configuration; and displaying the graphical user interface of the updated flow configuration within a page of the software application.

16. The computer-readable medium of claim 15, wherein the method further comprises identifying an operation from among the operations within the optimized model to impose a restriction based on an order of the operation with respect to other operations and the optimized model.

17. The computer-readable medium of claim 16, wherein the method further comprises executing the MIP optimizer again on the MIP model to generate a second flow configuration within the supply network, wherein the executing again comprises instructing the MIP optimizer to enforce the restriction on the identified operation and permitting linear constraints on the other operations when determining the second flow configuration.

18. The computer-readable medium of claim 17, wherein the executing further comprises shrinking the supply network during an iteration of the MIP optimizer, and executing the MIP optimizer on the shrunken supply network during a next iteration of the MIP optimizer.

* * * * *